(12) United States Patent
Bitsch

(10) Patent No.: US 7,814,101 B2
(45) Date of Patent: *Oct. 12, 2010

(54) TERM DATABASE EXTENSION FOR LABEL SYSTEM

(75) Inventor: René Bitsch, Helsinge (DK)

(73) Assignee: Microsoft Corporation, Redmond, WA (US)

( * ) Notice: Subject to any disclaimer, the term of this patent is extended or adjusted under 35 U.S.C. 154(b) by 189 days.

This patent is subject to a terminal disclaimer.

(21) Appl. No.: 10/696,933

(22) Filed: Oct. 30, 2003

(65) Prior Publication Data

US 2005/0097109 A1    May 5, 2005

(51) Int. Cl.
  *G06F 7/00* (2006.01)
  *G06F 17/30* (2006.01)
(52) U.S. Cl. .............. 707/736; 707/758; 707/770; 717/127; 717/136; 717/163
(58) Field of Classification Search ......... 707/100–102, 707/2–4, 3–6, 104.1, 736, 758, 770; 704/7, 704/4; 717/127, 136, 163
See application file for complete search history.

(56) References Cited

U.S. PATENT DOCUMENTS

| | | | | |
|---|---|---|---|---|
| 5,842,217 A | | 11/1998 | Light | 707/101 |
| 5,995,979 A | * | 11/1999 | Cochran | 707/104.1 |
| 6,006,225 A | * | 12/1999 | Bowman et al. | 707/5 |
| 6,011,847 A | * | 1/2000 | Follendore, III | 713/160 |
| 6,425,123 B1 | * | 7/2002 | Rojas et al. | 717/136 |
| 6,467,082 B1 | * | 10/2002 | D'Arcy et al. | 717/127 |
| 6,493,661 B1 | | 12/2002 | White, III et al. | |
| 6,507,812 B1 | * | 1/2003 | Meade et al. | 704/8 |
| 6,567,973 B1 | * | 5/2003 | Yamamoto et al. | 717/136 |
| 6,629,104 B1 | * | 9/2003 | Parulski et al. | 707/758 |

(Continued)

FOREIGN PATENT DOCUMENTS

WO    WO 94/19755    9/1994

OTHER PUBLICATIONS

Terry Winograd—"From programming Environments to Environments for designing"—Communications of the ACM, vol. 38, Issue 6 (Jun. 1995) (pp. 65-74).*

(Continued)

*Primary Examiner*—Jean B. Fleurantin
*Assistant Examiner*—Anh Ly
(74) *Attorney, Agent, or Firm*—Westman, Champlin & Kelly, P.A.

(57) ABSTRACT

A method stores, uses and suggests terms in a business solution software program having multiple languages. Instead of only searching for a general use of a term based on its text and general use, one can search for a term based on a specific use in a module. Each term is assigned its own unique identifier in a term ID structure, which also contains information related to how the term is used in the system. The text for the term is stored in a separate term text structure. The term text structure contains the text of the label in all of the available languages. The specific use of the term is stored in a separate term area table including a description of the specific use of the term. When a new label is written the developer can search the current terms to find a term that matches the intended use.

12 Claims, 12 Drawing Sheets

U.S. PATENT DOCUMENTS

| | | | |
|---|---|---|---|
| 6,772,110 B2* | 8/2004 | Real et al. .................... 704/8 |
| 6,804,675 B1* | 10/2004 | Knight et al. ............... 707/754 |
| 7,725,447 B2* | 5/2010 | Subramaniam et al. ..... 707/758 |
| 2001/0002469 A1* | 5/2001 | Bates et al. .................... 707/1 |
| 2002/0123878 A1 | 9/2002 | Menke .......................... 704/2 |
| 2002/0156770 A1* | 10/2002 | Krichilsky et al. ............. 707/3 |
| 2002/0156775 A1* | 10/2002 | Yamamoto ..................... 707/3 |
| 2002/0193986 A1* | 12/2002 | Schirris ......................... 704/8 |
| 2003/0004946 A1* | 1/2003 | VanDenAvond et al. ....... 707/9 |
| 2003/0046639 A1* | 3/2003 | Fai et al. ..................... 715/513 |
| 2003/0094494 A1* | 5/2003 | Blanford et al. ........ 235/462.07 |
| 2003/0101046 A1* | 5/2003 | Krasnov ........................ 704/7 |
| 2003/0115552 A1* | 6/2003 | Jahnke et al. ............... 715/536 |
| 2003/0125972 A1* | 7/2003 | Luce et al. ..................... 705/1 |
| 2003/0140098 A1 | 7/2003 | Brennan et al. |
| 2003/0167209 A1* | 9/2003 | Hsieh .......................... 705/26 |
| 2003/0220912 A1* | 11/2003 | Fain et al. ...................... 707/3 |
| 2004/0039989 A1* | 2/2004 | Warren ....................... 715/505 |
| 2004/0056894 A1 | 3/2004 | Zaika et al. |
| 2004/0128272 A1* | 7/2004 | Salomon et al. ................ 707/1 |
| 2004/0230328 A1* | 11/2004 | Armstrong et al. ........ 707/104.1 |
| 2004/0243572 A1* | 12/2004 | Muto ............................. 707/3 |
| 2004/0254928 A1* | 12/2004 | Vronay et al. .................. 707/5 |
| 2004/0260689 A1* | 12/2004 | Colace et al. ................... 707/3 |
| 2005/0021533 A1 | 1/2005 | Ayachitula et al. |
| 2005/0038558 A1* | 2/2005 | Keene ......................... 700/235 |
| 2005/0071324 A1* | 3/2005 | Bitsch et al. .................... 707/3 |
| 2005/0267787 A1* | 12/2005 | Rose et al. ..................... 705/5 |
| 2006/0074987 A1* | 4/2006 | Bitsch ..................... 707/104.1 |
| 2006/0146790 A1* | 7/2006 | Caballero-McCann et al. ... 370/352 |
| 2006/0224995 A1* | 10/2006 | Treibach-Heck et al. ........ 707/3 |

OTHER PUBLICATIONS

Jasmine J. Ahuja—"Cleint-Server Applications in Java"—Pace University—Dec. 1997 (pp. 1-37).*

Third Chinese Office Action for Serial No. 200480001670.X, dated Mar. 19, 2010.

Notice of Allowance dated Mar. 22, 2010 in related case U.S. Appl. No. 10/674,834, filed Sep. 30, 2003.

Official Action dated Mar. 22, 2007 in related case U.S. Appl. No. 10/674,834, filed Sep. 30, 2003.

Official Action dated May 21, 2007 in related case U.S. Appl. No. 10/674,834, filed Sep. 30, 2003.

Official Action dated Jun. 4, 2007 in related case U.S. Appl. No. 10/674,834, filed Sep. 30, 2003.

Official Action dated Dec. 10, 2007 in related case U.S. Appl. No. 10/674,834, filed Sep. 30, 2003.

Chinese First Official Action dated Dec. 6, 2007 for Serial No. 200410104786.8.

EPO-Communication European Search Report dated Apr. 21, 2006 for EPO Appln. No. 04 018 143.0.

EPO-Examination Report dated Aug. 11, 2008 for EPO Appln. No. 04 018 143.0.

"Message Database" IBM Technical Disclosure Bulletin, IBM Corp., New York, NY US, vol. 36, No. 7, Jul. 1, 1993, pp. 397-398 XP000383676 ISSN: 0018-8689.

Smith, E. et al.; "A Multi-Tiered Clasification Scheme for Component Retrieval" Euromicro Conference, 1998. Proceedings, 24th Vasteras, Sweden, Aug. 25-27, 1998, Los Alamitos, CA, USA, IEEE Comput. Soc. US, vol. 2, Aug. 25, 1998, pp. 882-889, XP010298000 ISBN: 0/8186-8646-4.

Chu, W.C.; "The Integration and Adaptation of Reusable Components through Semantic Interface Analysis," Computer Software and Applications Conference, 1994. COMPSAC 94. Proceedings, 18th Annual Int'l Taipei, Taiwan—Nov. 9-11, 1994, Los Alamitos, CA, USA, IEEE Comput. Soc. Nov. 9, 1994, pp. 252-257, XP010100755 ISBN: 0-8186-6705-2.

Decision on Appeal dated Feb. 23, 2010 for related case U.S. Appl. No. 10/674,834, filed Sep. 30, 2003.

Examiner's Answer dated Sep. 3, 2008 for related case U.S. Appl. No. 10/674,834, filed Sep. 30, 2003.

Second Chinese Office Action Serial No. 2004/0001670.X, Nov. 16, 2009.

Supplementary European Search Report, (Jun. 19, 2009).

* cited by examiner

FIG. 3A

| GUID | NAMESPACE | CATEGORY | DESCRIPTION | COPIED FROM |
|---|---|---|---|---|
| 1 | | | | |
| 2 | BILLING MODULE | | | |
| 3 | | MENU BAR | USED IN CASE OF A LEDGER | 1 |

LABEL ID 230
231 — GUID
232 — NAMESPACE
234 — CATEGORY
235 — DESCRIPTION
236 — COPIED FROM
301, 302, 303 — rows

LABEL TEXT 240

| LABEL ID 244 | TEXT ID 245 | TEXT 241 | EDITED DATE 242 | LANGUAGE 243 |
|---|---|---|---|---|
| 1 | 351 | DO YOU WANT TO SAVE THE CHANGES YOU MADE TO | 22-AUG-2003 | ENGLISH - UNITED STATES |
| 1 | 352 | MÖCHTEN SIE DIE ANDERWUNGEN GEBILDET AN SPEICHEIN | 27-AUG-2003 | GERMAN - DEUTCH |
| 1 | 353 | LAVE JER VILLE GERNE OPSPARE DEN FORANDIGERJER INDRETTET TIL AT | 27-AUG-2003 | DANISH - DANSK |
| 1 | 354 | VOUS VOULEZ EN SAUVER LES CHANGEMENT VOUS FAIT Á | 27-AUG-2003 | FRENCH - FRANCAIS |

FIG. 3B

TERM ID 730

| GUID 731 | CATEGORY 734 | DESCRIPTION 735 | DUPLICATED FROM 736 | STATE 737 |
|---|---|---|---|---|
| 8 | | | | REVIEWED |
| 9 | | | 8 | |
| 10 | MENU BAR | USED IN LEDGER FOR A MEDICAL CLIENT | | SUGGESTED |

FIG. 7B

TERM TEXT 740

| TERM ID | TEXT | EDITED DATE | LANGUAGE |
|---|---|---|---|
| 8 | DO YOU WANT TO SAVE THE CHANGES YOU MADE TO | 22-AUG-2003 | ENGLISH - UNITED STATES |
| 8 | MÖCHTEN SIE DIE ANDERWUNGEN GEBILDET AN SPEICHEIN | 27-AUG-2003 | GERMAN - DEUTCH |
| 8 | LAVE JER VILLE GERNE OPSPARE DEN FORANDIGERJER INDRETTET TIL AT | 27-AUG-2003 | DANISH - DANSK |
| 8 | VOUS VOULEZ EN SAUVER LES CHANGEMENT VOUS FAIT À | 27-AUG-2003 | FRENCH - FRANCAIS |

TERM DATABASE EXTENSION FOR LABEL SYSTEM

BACKGROUND OF THE INVENTION

The present invention relates to merging and developing labels in a business solution software program. In particular, the present invention relates to a label database and a label dialog used in developing and merging labels in modules for the business solution software.

Business solution software programs provide an end user, typically a corporation, with a customizable, scalable and global enterprise resource planning solution that supports connectivity with the user's various business partners. Many business solution software programs provide the ability to expand the basic functionality of the software beyond the original product to further meet the needs of the implementing corporation. This new or additional functionality is provided through additional modules that are written to take advantage of the existing features and existing data contained within the business solution software. Often these additional modules automatically synchronize the software and the existing data with both the old and new functionalities of the business solution software.

Some business solution software provides the ability to conduct business in different countries, across multiple languages and in multiple currencies. Through the use of multi-language capabilities provided in business solution software it is possible to transmit documents, such as invoices, in the recipients preferred language. However, changing the language of the documents in current systems requires loading the new language into the business solution software, and changing the entire operating language of the system.

Communication in different available languages of the business solution software is handled through the use of a plurality of labels. Labels are text that appear on a user interface component, or in a printed document. However, labels can also be images, bitmaps, icons, movies, or any kind of data that has to be different in other languages. Labels can include menus, buttons, dialog boxes, etc. Further, labels can be used on controls that has label properties such as "label", "help", "caption" and "tool tip". The labels in current business solution software are stored in separate resource files with one resource file dedicated to each language used by the business solution software. Further, each module in the business solution software has its own resource file that is not shared with other modules, or the business solution software itself.

Throughout the development of business solution software there has been a strong desire among developers to reuse existing labels. However, it has been observed that it is not as advantageous to reuse existing labels, because various properties of the label can change between different uses, or the meaning of a label can vary between different developers. This can create problems when a term is changed. For example, a label text can be used in a menu on one application and a button on another, thus resulting in different properties for each label. What most developers desired was to reuse the terms or text that comprise the labels so as to reduce the costs associated with developing labels for various modules on the system.

As mentioned above, typically, in business solution software modules the labels are kept in resource files. However, current business solution software does not use the generic resource files that are available through database metadata stores, such as structured query language (SQL) tables or through web services. Typically these labels, in the business solution software, are module specific, and are stored in proprietary resource files with one resource file dedicated to each language present in the module. One problem associated with using proprietary resource files is that when a developer desires to replace or edit a portion of the labels in one module with new information or properties contained in another resource file the development system does not look for another label in other modules of the business solution software having the same label properties and/or terminology as the desired label. Further, using resource files makes the management of labels extremely difficult due to the large number of labels present in the software solution. However, in a business solutions environment the business solution software is required to handle a number of different solutions that are developed by multiple vendors. Often times the developers of these modules are developing labels that overlap with labels developed for other modules in the business solution software. The costs associated with developing labels, and translating (when multi-language support is desired) the labels is very expensive and time consuming, especially when the label and its translations already exist elsewhere in the business solution software. Therefore, it is desirable to have a label system that uses the combined contributions of the various module vendors, as opposed to a completely proprietary system that requires each vendor to develop its own labels for each desired label. Further, it is desirable for a system that makes it possible to search existing label texts and provides the ability to reuse the text.

When searching for labels the selection of namespace and categories it is difficult for the developer to select the correct category. The developer often does not know if the subset of labels located in the current environment satisfies the current needs. Therefore, the developer desires to know what labels are available in the database that hold the desired labels. Further the developer desires to create the labels that contain the correct information for the use and the appropriate translations for the terms in the label.

SUMMARY OF THE INVENTION

The term database of the present invention extends the label system by providing extra features. These extra features are controlled by translators or a standards organization. These features make it possible to add extra search criteria to the label dialog to help find labels that correspond to the actual desired use of the label. When these features are activated, additional subject related results will be returned to the developer to assist in choosing the correct term for the label. As developers tend to think in their own native languages, these features will help standardize the terms used in labels when a single word in the developer's native language can be translated into multiple words in another language.

One embodiment of the invention addresses a situation in which a developer is developing a new module or editing an existing module for a business solution software. The present invention allows the developer to identify existing terms through a dialog development tool. First, the developer opens a user interface in a development display. This display displays to the developer a search function that allows a search through the term text database and access to all of the available terms. The developer then enters into the search engine the text for the desired term. This text can be entered in its totality or as a portion of the desired term using regular expressions. The developer also indicates the desired use of the present term.

Based on the entered data, the search engine searches the term text database and the term area, and identifies those terms having texts that most closely match the desired text, and those terms having a similar meaning as the desired use of the term. The identified terms are returned to the developer in the search engine display and can be displayed in a data grid. The results are ranked according to a predetermined method, such as terms having text most closely matching the desired text are displayed first, and those not are displayed last. Then the developer can find a result in the returned results containing the desired text. If one of the results contains the desired text for the new term, the developer can select the desired term from the results and duplicates it into a new label.

Upon selecting the results, the developer is presented with more information about the specific term contained in the database. As the use of the selected term is not known to the developer the developer duplicates the term to the new label.

When the selected term is duplicated to the new label, a GUID is generated for the new label, and an entry in the new label's record is generated indicating the GUID of the term that was duplicated to this label. This entry is provided to allow the text of the new term to be updated when the parent term's text is changed. Further, when a term is duplicated to the new label any associated translations or other information are duplicated to the term text table for the new label. This allows for the full language capability of the business solution software system to carry over to the new term without incurring any additional costs associated with translating the new label into the available languages. In another embodiment, when a translated version of the term is updated, all related labels sharing the same master term are updated with the new version of the translated term. This generally occurs when a program is executed to update labels.

Through the specific use feature of the dialog the developer is able to quickly an easily identify those terms that best match the desired use of the term. This feature is especially important when the developer is presented in the results with the same word in his native language in more than one category. As words in one language often have more than one equivalent word in a second language the specific use will help the developer pick the label that has associated translations that best meet the desired use. A second advantage of the present system is that developers will be presented with terms other than their intended term when searching the database. These words will represent words or terms that have already been used by other developers and translated into other languages. If the developers start using these terms there will become a standardization of the terms used in modules, with a resulting reduction of cost to developers.

A second embodiment of the present invention is directed to a data structure that supports the specific use searching of the present invention. The data structure includes a term ID table, a label text table, and a label area table. The term ID table holds information related to the term including its identifier, category of general use (button, label), and a state field. The state field indicates the source or status of the term. The term text table holds the various versions of the terms text across the various languages. The term area table includes the specific use of the label associated with term as well as description of how the term is used. These tables enable the developer to accurately determine if a term is appropriate for the desired use.

BRIEF DESCRIPTION OF THE DRAWINGS

FIGS. 3A and 3B are diagrammatic illustrations of the fields in the label ID table and the label text table.

FIGS. 7B and 7C are diagrammatic illustrations of the fields in the term ID table and the term text table.

DETAILED DESCRIPTION OF ILLUSTRATIVE EMBODIMENTS

Figure 1:
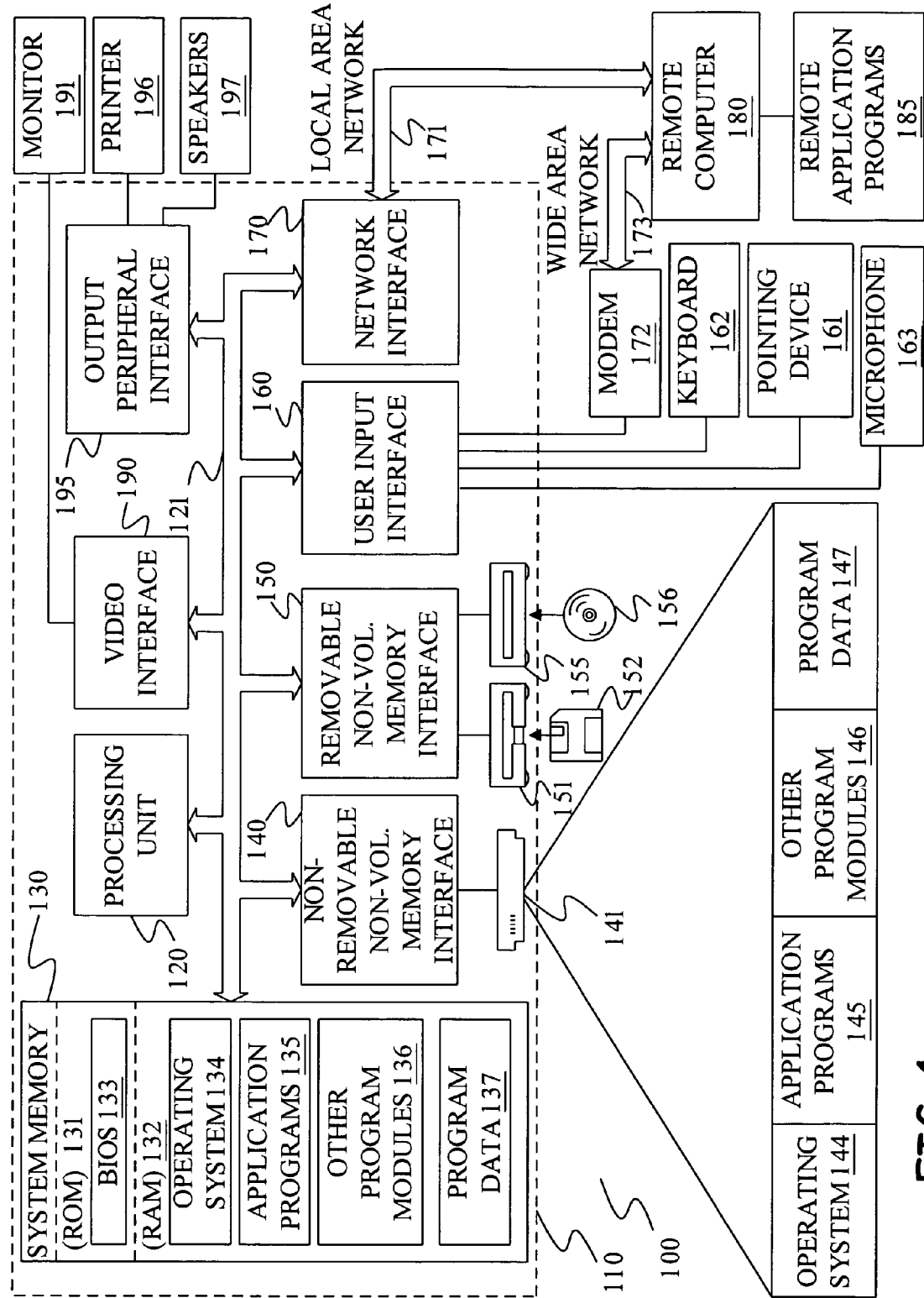
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

In one embodiment, system 100 includes software for generating a business management solution that can integrate general accounting and business functions with specific application modules. These modules can include modules for finance, trade, logistics, production, customer service, projects and human resources. However, other module types can be used in the business management solution. The solution of the present invention can be configured to support multiple currencies (Euros, Dollars, Yen, Wan, etc), multiple languages (English, German, French, Danish, Russian, Japanese, Chinese, etc) and multiple tax formats (for use by end users who deal with multiple taxing authorities).

The modules used in the business management solution can be developed from a variety of different sources. In one embodiment, a common link between all of these modules is the use of labels. Labels are text represented by an identifier. Labels can include dialog boxes, text strings, or any text used to convey information to the user. Labels are commonly presented to the user through a resource such as a graphical user interface, or GUI. However, the label can be presented to the user though any other means that presents text to the user. Further, labels can be used on controls that have label properties such as "label", "help", "caption" and "tool tip". In previous business solutions software the labels for each module are kept in separate resource files. However, these resource files were commonly kept in a flat file architecture that was proprietary to the specific module. Often during the development process of the modules, the developer knows of a label in another module that meets the requirements of a currently being created label. However, the proprietary file source structure of the prior art systems prevents the developer from using labels from one module in another module, nor was it possible to search for labels.

Figure 2:
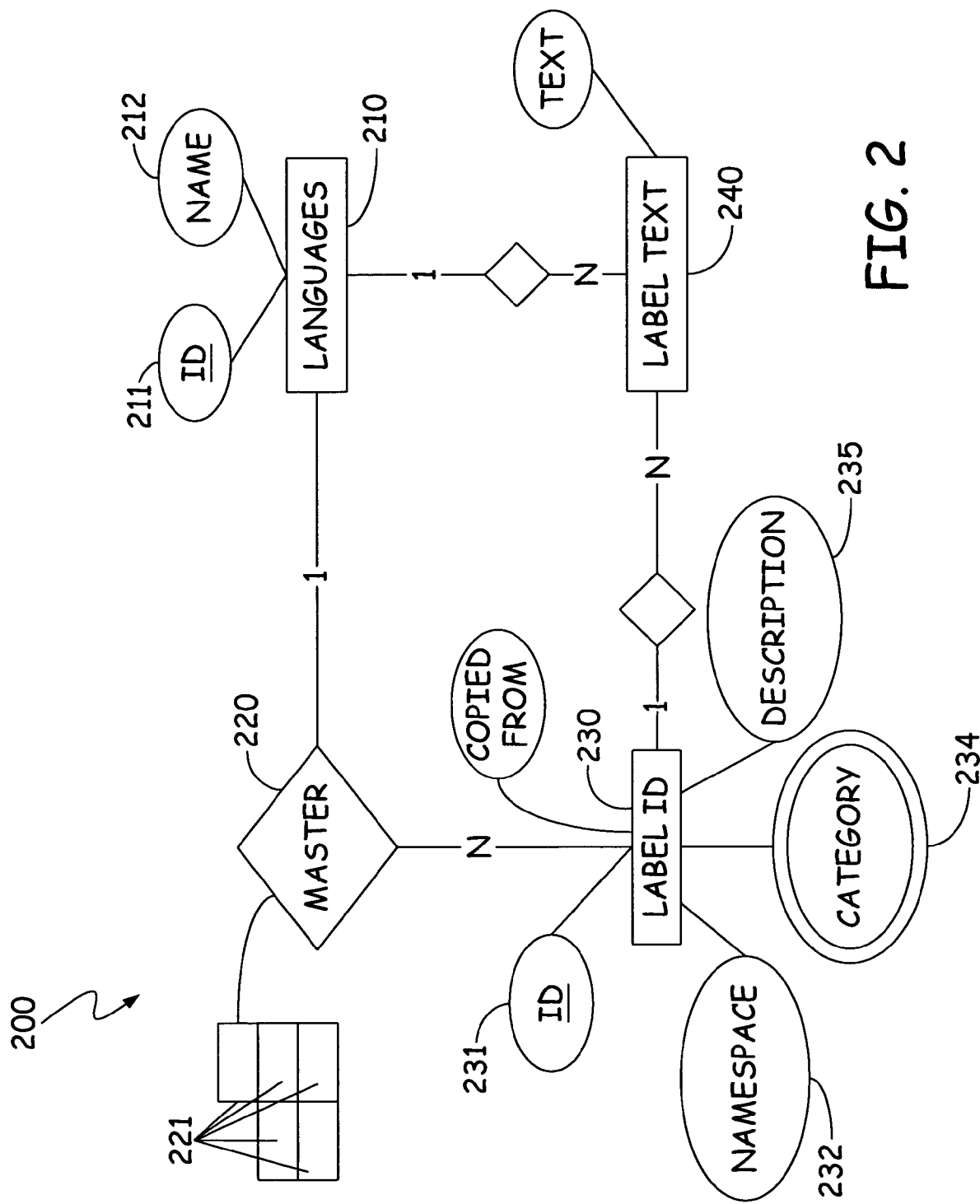
FIG. 2 is a block diagram illustrating the tables that comprise the label system.

FIG. 2 is an entity relation diagram illustrating the relationship between various collections that comprise a label in business solution system 200, according to one embodiment of the invention. The entity relation diagram of FIG. 2 includes a language table 210 (or other indication of available languages in the system), a master 220, a label ID table 230, and a label text table 240. In one embodiment these collections are organized as structured query language (SQL) metadata stores arranged into tables. However, other arrangements and other databases for the collections can be used. The label ID table 230 and the label text table 240 are described in greater detail with reference to FIGS. 3A & 3B.

The language table 210 is a table that includes at least two sub-fields. The two sub-fields in the language table 210 are a language ID field 211 and a language name field 212. The language ID field 211 holds a code that indicates a specific language, and is understandable by the business solution software program. The language name field 212 is a text field that holds the name of the language. For example, if one of the available languages is English-United States then the language ID field 211 illustratively could be "01", or it could be "en-us", if using ASCII standards. However, other ID types can be used in the language ID field 211. The language name field 212 of the metadata table for this entry would be "English-US", for example. Alternatively, this entry could be a label with the specific language text if this solution was provided by the specific solution.

The information stored in the language table 210 can be displayed to the user in a label dialogue display when the user desires to view or change the operating language of the system. The language table 210 is in a 1:n relationship with the label text table 240. This relationship (1:n) occurs because there can be a plurality of label texts representing different labels in each language available to the system 200.

The master 220 is in one embodiment a table including one version of each label in system 200. In one embodiment, the master 220 holds the original version of the label in the original language and format. However, other versions of the label can be stored in the master 220. For example, if best practices guidelines are used then the system 200 can store in the master 220 the label in English-United States. The best practices guidelines are a set of procedures that standardize label development with specific category types, descriptions, and languages. Each label in the system 200 has an associated entry in the master 220. The label represented by the master is used when a label's translation is being updated, the label has not been translated into the currently selected (active) language, or for any reason becomes inaccessible to the system 200. However, in alternative embodiments, information that is stored in the master 220 can be stored as a field or fields in either the label table 230 or the language 240 indicating the label ID of the master label. Further, the master 220 can be a simple field keeping information about which language label was created. This field can be located in the label ID table 230.

Each master corresponds to one entry in the label ID table 230. The label ID table 230 includes various properties that assist a translator (who is translating the text) in translating the label correctly. These properties also assist the developer in using the label properly. The relationship between a master and the label ID table 230 is 1:n, as multiple label IDs can share the same master.

The label text table 240 includes entries containing the text for each label identified by a label ID. The label text table 240 also includes entries containing translations for each label ID in various languages. The relationship between the label ID table 230 and the label text table 240, as well as the relationship between the language table 210 and the label text table 230 is 1:n. This is because there is one entry in the label ID table 230 for a label, but the text of a label can exist in multiple languages. However, in other embodiments of the present invention the relationship between the label ID and label text can be 1:1 (or 1:0 if no text is present), where each translation of the master label has its own unique label ID and entry in label ID table 230.

FIG. 3A illustrates the fields that comprise the label ID table 230 according to one embodiment of the present invention. Label ID table 230 includes an ID field 231, a namespace field 232, a category field 234, and a description field 235. In other embodiments the label ID table 230 can include a field 236 indicating whether the entry in the label ID table is duplicated from another label, or has been duplicated to another entry in the table.

Typically, labels are kept in resource files. Present business solution systems do not use generic resource files that are available through database metadata stores such as SQL tables. In present business solution systems these labels are stored in proprietary resource files. One problem associated with using proprietary resource files is that when the developer desires to replace a portion of the label or labels in the system with a file having all of the resources for the file, the system does not look for another file in the system that has the same label properties or terminology as the current label. However, in a business solutions environment, the business solution system is required to handle a number of different solutions to the same or similar problems that are developed by multiple vendors. Therefore, the label system 200 of the present invention can use the sum of all of the contributions made by the various vendors.

The ID 231 field is used to identify a specific label in the system 200. In one embodiment this ID is a global unique identifier or GUID. A GUID is used to avoid problems occurring because two vendors have chosen the same identification number for two unrelated labels. A GUID in one embodiment, is a 128 bit integer (16 bytes) that can be used across all computers and networks wherever a unique identifier is required. Use of such an identifier system reduces the chances that two labels will have the same ID. A GUID is represented, in one embodiment, as a string and is formatted according to the following pattern:

xxxxxxxx-xxxx-xxxx-xxxx-xxxxxxxxxxxx where the values of the GUID is represented as a series of lower-case hexadecimal digits in groups of 8, 4, 4, 4, and 12 digits and are separated by hyphens. For example the GUID return value for the entry of line 301 can be 382c74c3-721d-

4f34-80e5-57657b6cbc27. However, other formats types can be used for the ID field 231. Each time a new label is generated it is assigned a new GUID. In one embodiment a new label is defined as a label that is new to the system 200, and not merely a translation of an existing label. However, in other embodiments, a new entry in the ID field 231 is generated for the translations of existing labels.

The use of a GUID provides added benefits over current systems. First, there is no need to divide each label into a plurality of languages. Further, GUIDs allow for each label to be uniquely identified without the need to control the uniqueness in other ways such as through the use of row numbers. Second, GUIDs allow the physical storage of labels to be changed from proprietary resource files to common resource files such as a metadata database, on a web service.

The namespace field 232 in label ID table 230 is a special field entered into the label ID to assist translators in obtaining the correct terms for the label when translating the label text from the master language to the target language. In current label systems it is not possible to see easily where in the program a specific label is used. Further, it is not easy to see in which areas the label is used. Therefore, it is extremely difficult, if not impossible, for a translator to obtain the correct term for the label, unless the program is installed on their computer, and they are able to see where the label is used. The namespace field 232 makes it possible to see the area the label is used without having to have the program installed on the translator's machine. The information contained in the namespace field is provided by the developer when a new label is created (either automatically or manually), and provides information related to the use of the specific label. For example, in the entry of line 302 of FIG. 3A, the name space field 232 tells the translator or developer that this label is used in a billing module.

The category field 234 in the Label ID table 230 is a special field that illustrates in which component of the program the label is used. Further, the use of the category field 234 assists a developer while creating a label text to write the label in the correct manner. The category is a combination of a node type and a property for the label. Node types are the specific properties of the label. Some of these labels properties can include "label", "help", "caption", etc. Thus, the category field 234 makes it possible to ensure that a label is used in a proper way for the desired program. Further, categories are a mapping of all of the controls present in the system. Therefore, it is possible to search the existing database of labels based on the type or category of label desired. In the present invention a category is created for each rule or control that is performed by the system 200. During the development of a module additional categories can be created if a special rule is needed for a specific label text. For example, the node field 234 can be an entry telling that the label at entry 303 is used on a menu bar of the module to direct the user to another point in the module. Each category is mapped to a specific function in the system 200.

The description field 235 is an entry in table 230 that describes to the user or developer how the label is used. For example, the description field 235 can be an entry telling that the label at entry 303 is used on a case of a ledger. This description can be in words (plain text) or it can be coded against a predetermined list of codes.

The duplicated from field 236 indicates whether the associated label of the entry has been duplicated from another label in the label system. If the label has been duplicated from another label, the duplicated from field 236 includes the ID from the parent or master label 220. In one embodiment this ID is the GUID of the parent. However, other ID's can be used in field 236. If the label is not a duplicated version of another label then the duplicated from field 236 is blank or set to null. Further, if the text or any other information of the label is changed from the master label's text after copying then the duplicated from field 236 is set to null, thereby eliminating any link between the master label 220 and this particular child label. However, other changes to the entry will result in the duplicated from field 236 being reset. In an alternative embodiment, the label ID table 230, of FIG. 3A includes fields that indicate what label ID's contain duplicated labels. A label in ID table 230 is either a master label or a child.

FIG. 3B illustrates the fields that populate the label text table 240 of a specific label. The label text table 240 entry includes at least three different fields: a label ID field 244, a label text field 241 and an edited date 242. In alternative embodiments of the present invention additional fields can be added to the label text table 240. These fields include a field 243 indicating the language the text is written in, or a field identifying the entry identifier of each version of the text in the label text table.

The text field 241 of the label text table 240 includes the most recent versions of the text for the label in all available languages for the system. However, other information can be stored in text field 241 such as language specific icons, bitmaps videos, etc. The first entry 351 in the label text table 240 for the label is in the original or master language the label was written. This text is referred to as the master text. If the label is developed according to the best practices guidelines, the master text will be written in English-United States. However, other languages can be used as the master language, and the best practices guidelines need not be followed. Generally, the master language will correspond to the current language the system is operating in.

As the label text is translated from the master language to another language, a new label text entry is made in the label text table e.g. 352 and 353. These entries contain translated versions of the original label text in their respective languages. For example, if the original text of the label is "Do you want to save the changes you made to", this text is stored in the first line 351 of the label text table 240. Later, when the text is translated into German, Danish and French, the translations are entered into the label text table in the entries below the master text entry. These added translations are indicated by entries 352, 353, and 354.

The edited date field 242 is provided in the label text table 240 so that developers know when the text of the label was last changed in the language associated with that particular entry in the label text table. Further, other fields containing validation information can be added, such as a "modified by" field. This date helps to ensure that if a translation for a text is provided, it does not replace an already more current version of the translation. When translations are automatically loaded into the system the translation dates are compared and if the version in the entry is more current than the proposed entry, the proposed entry is not entered into the table. Also the edited date field 242 allows the developer to check if the translations are current with the most recent version of the master text entry. In one embodiment, the master text entry's 321 edited date is desirably the oldest date in the label text table 240 for a particular label.

In some embodiments the label text table 240 includes a language field entry 243. The language field entry 243 indicates to the developer the specific language of a particular entry in the label text table, even if the developer does not speak or understand the language. This language indicator in the language field entry 243 can be a numerical representation of the language or it can be written as the name of the language, or any other kind of language identifier.

If a numerical representation is used to identify the language, the reference number or entry for the language may illustratively conform to a known standard, such as ASCII language codes or ISO 639. However, other codes can be used to identify the language of the text entry. If the name of the language is entered in the field 243, then the name of the language may illustratively be written according to a known standard (i.e. language names in English). However, other formats can be used.

The label text table 240 also includes an entry field 244 identifying the label ID 231 for the particular label text. This entry allows the developer to know to which label ID 231 the present text is related. Further embodiments of the label text table 240 include entries for a text ID 245. This text ID 245 is provided to individually identify each text label as its own entry in the label text table 240. The text ID 245 entry can be GUID, or it can be any other identification method consistent with the configuration of the label text table. In an alternative embodiment label text table 240 and label ID table 230 can be merged into one table or database. In this embodiment an additional set of fields would be needed to manage the labels and to insure the correct label language text is displayed when the module is run. Further, an index would be added to manage the loading of the labels.

Figure 4:
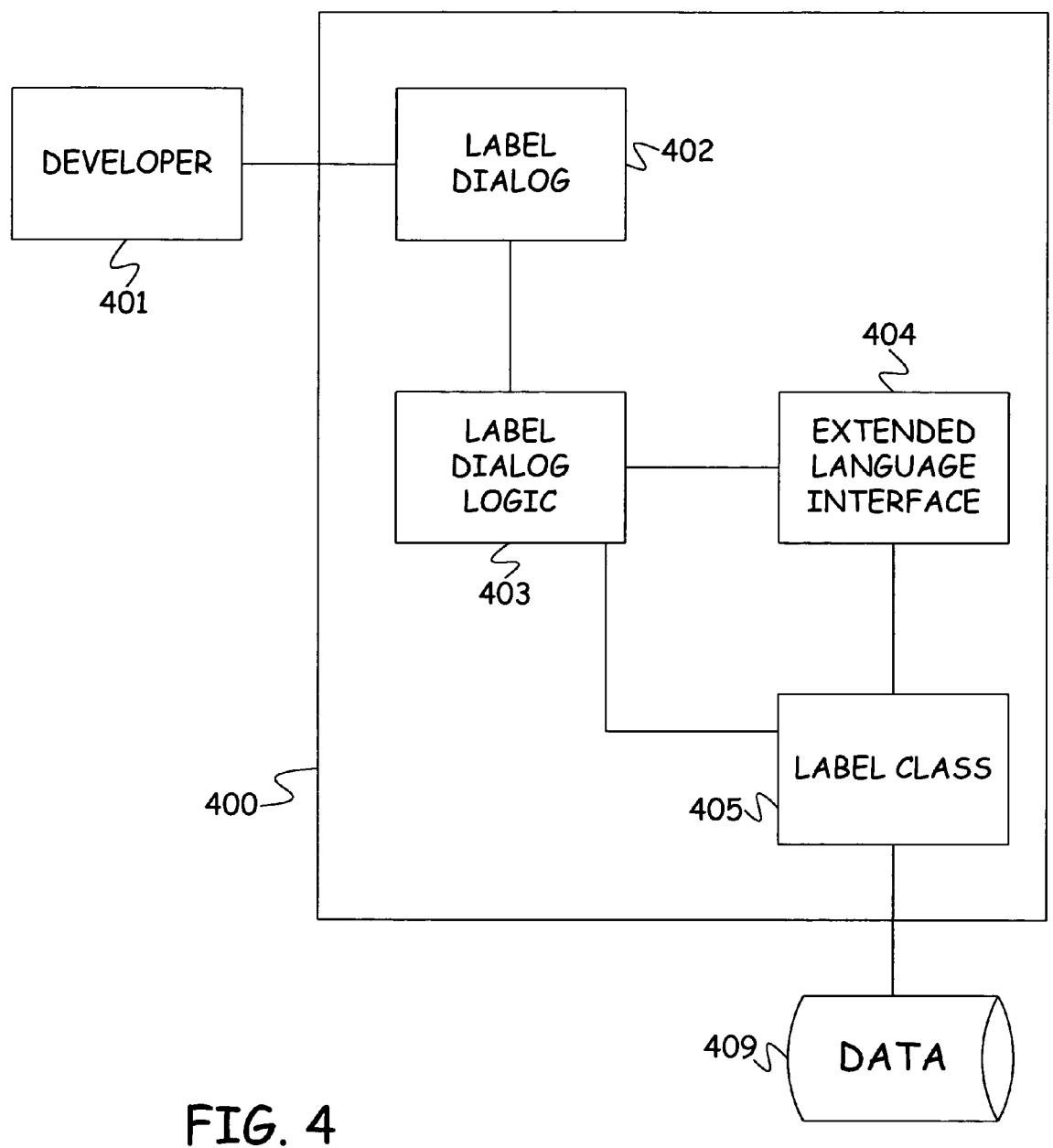
FIG. 4 is a block diagram illustrating the relationship between the components of the label system.

FIG. 4 is a block diagram illustrating the components that comprise the label system interface 400. The label system interface 400 is an interface that links the developer 401 to the metadata store 409, and allows the developer to manipulate existing labels when developing new modules for the system 200. The label system interface 400 includes a label dialog 402, a label dialog logic component 403, an extended language interface 404, and a label interface 405.

The developer interacts with the label system interface 400 through the label dialog 402. Label dialog 402 is a user interface that allows the developer access to the features of the label system interface. In one embodiment, the label dialog 402 is a window that allows the user to view and manage the use of a specific label. The label dialog 402 uses this interface to the metadata store to handle labels, and to access the full set of commands available for the label in all of the available languages. In order to provide these features the label dialog interface 402 requires access to all of the available languages for each label in the label system 400.

However, the label dialog 402 does not contain any logic to determine if a label can be used in a specific situation. All controls are passed to a class controlling the label interface or label dialog logic component 403. The label dialog logic component 403 is designed to be used with the label dialog 402, but because it contains all of the logic for the label dialog 402 certain features of the label dialog logic can be reused in other areas. Further, the label dialog logic component 403 ensures that each label is used in a way that is consistent with the correct combination of namespace and category for the label. This logic prevents the inadvertent use of a label in a different area without first creating a new master label.

The extended language interface 404 provides the label dialog interface 400 access to all of the languages available in the system. Extended language interface 404 uses another class to make multiple languages available to the label dialog logic component 403 and label dialog 402. The extended language interface 404 has only methods that are common to more than one language in the system (returning a list of all available languages, and also returning the ID for the current language). Methods that are only relevant to one language are located directly on the label class 405. The label class makes it possible to connect to the labels in the metadata. There is one instance of the label class in each available language However, in some cases there may be no instance for a particular class.

The language interface component 404 also controls access to the available languages. The language interface component 404 contains a map of instances of the label. Also in the language interface component 404 is an interface to the each of the available extra language class for the present label.

Figure 5:
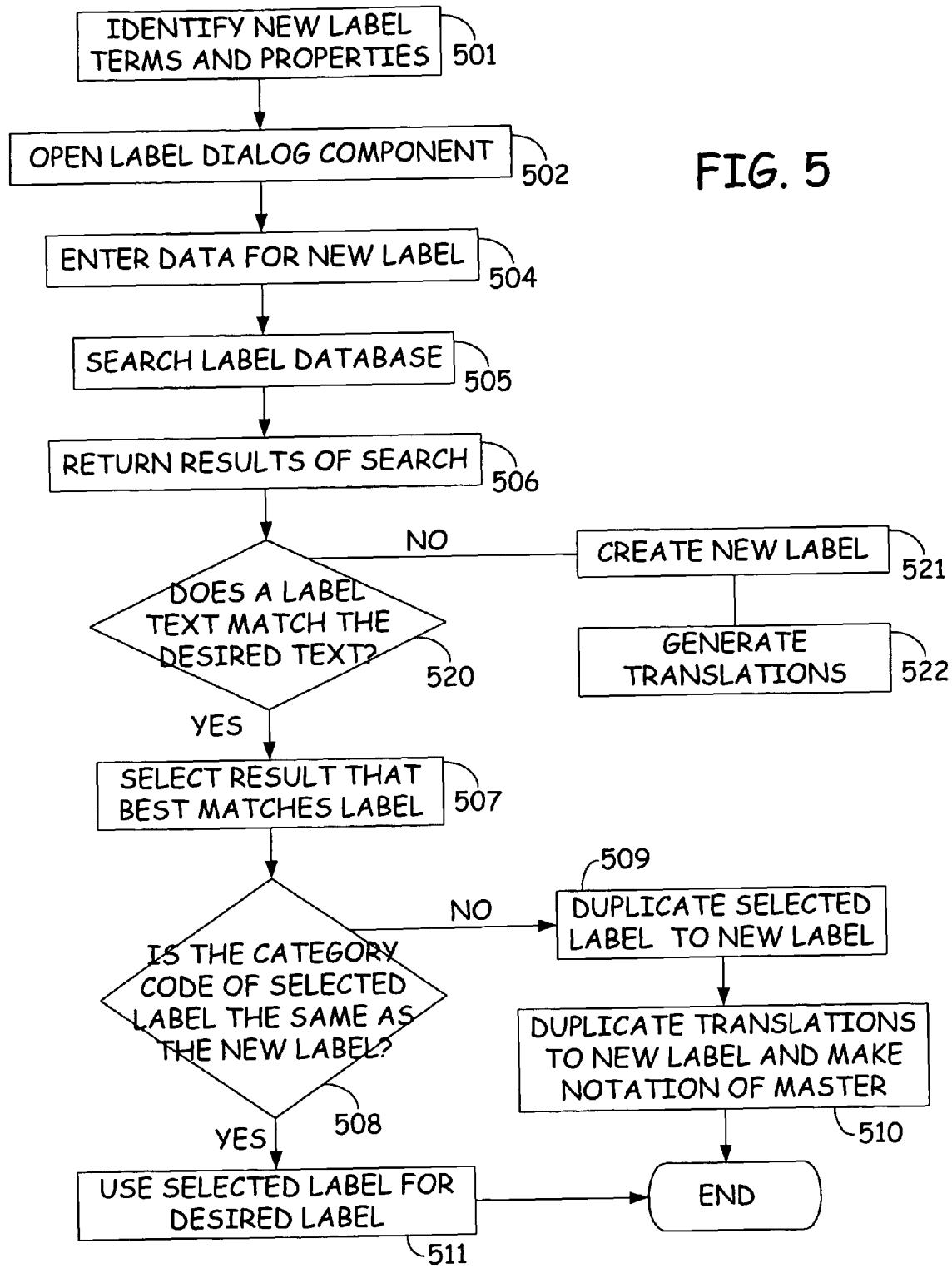
FIG. 5 is a flow diagram illustrating the steps executed when a new label is created.

FIG. 5 is a flow chart illustrating one example of the steps performed when a developer creates a new label for a module during the development of a portion of the module. For example, if the developer desires to make a label representing an input for a "customer" in a module. The developer must decide how the label will be used in the module. The term "customer" has many different meanings. For example, customer may mean one who buys goods and services from you, or it can mean one "who" you deal. The use of this word will have an impact on the text in other languages. This is illustrated at block 501 of FIG. 5.

Next the developer opens the label dialog program. The label dialogue that is opened is illustratively similar to the label dialog 600 illustrated in FIG. 6. However, other interfaces can be used. The interface that is presented allows the developer to enter in the specific text that they desire for the label. The opening of the label dialog is illustrated at block 502 of FIG. 5.

Once the label dialog has been opened, the developer then enters in the desired text for the label at line 602. Alternatively, the developer can enter at line 602 a portion of the desired text for the label. For example, the developer can enter in the text section "customer" or can enter "cust". Further, the developer enters data into the interface indicating how the new label is to be used at lines 603 and 604. This data can be used for searching for existing labels in the label system or can be used when creating a new label. For example, if the developer is creating a module for that manages sales, and wants to generate a label for a purchaser using the term "customer", then the developer would enter in the category code for a purchaser at line 604. This code can be entered manually, by a pull down menu, or automatically by using the current system settings. This category code controls the rest of the process used by the function. Generally, the category code and the namespace entries in the label dialog conform to the current settings of the label system. The entry of data is illustrated at block 504 of FIG. 5. This data is entered in as a regular expression. Further, in alternative embodiments the developer can control the search, by selecting a check box limiting the search to selected categories.

The developer activates a search function by selecting button 650. However other techniques can be used to activate the label search function. The activation of the search engine is illustrated at block 505 of FIG. 5.

The label dialog then searches though the database to find entries in the database matching the entered text. During the search process a progress indicator may be displayed to the user. One progress indicator is illustrated by reference number 640 in FIG. 6. When the search is complete the progress indication disappears, and the dialogue returns to the developer a display of all of the labels that matched the initial query in the selected language. This is illustrated at block 506.

Figure 6:
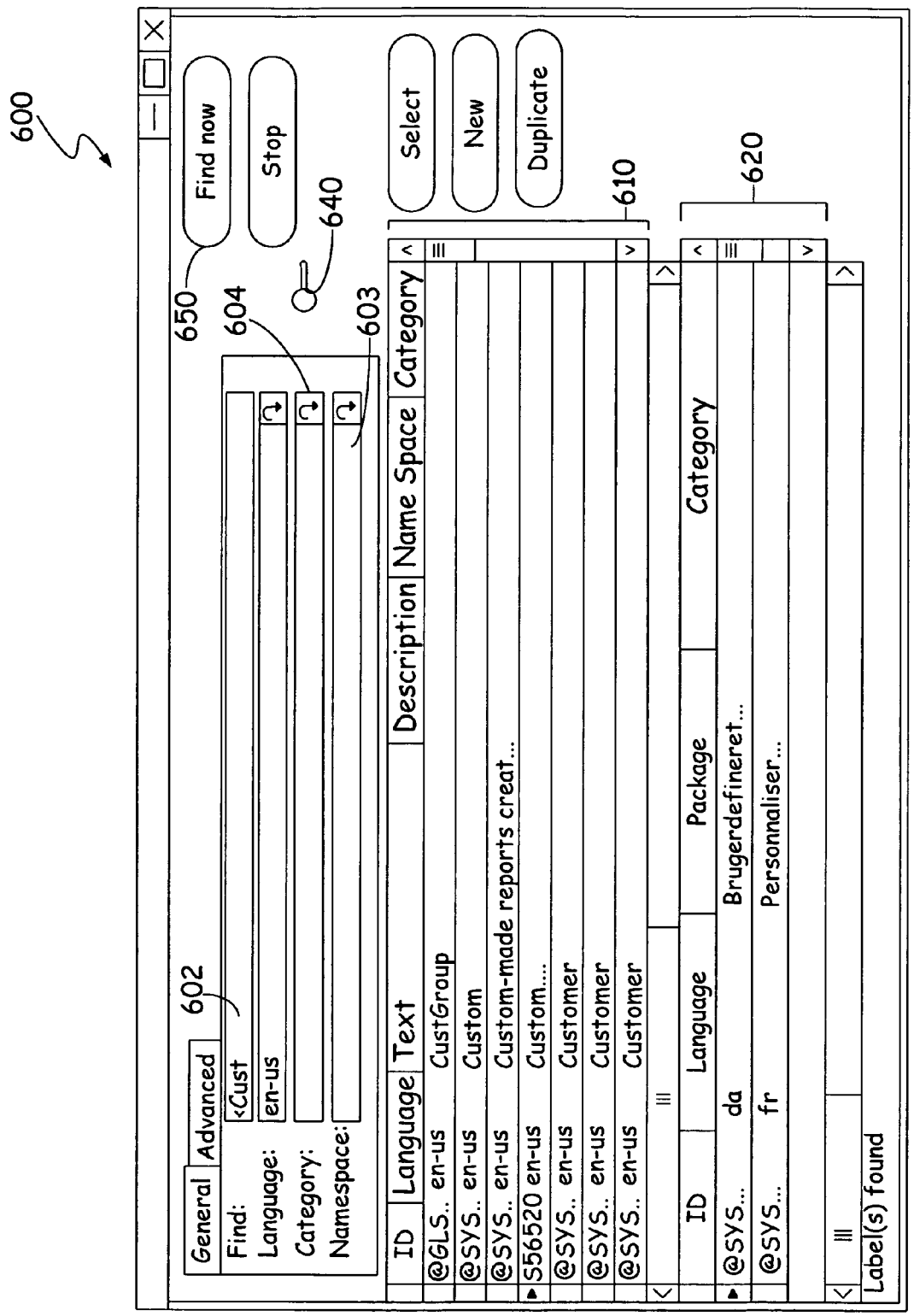
FIG. 6 is an example of a user interface invoked by the user when developing and searching the label database.

The interface 600, in one embodiment, enlarges to display the identified matches as illustrated in FIG. 6. In this embodiments the list of matches displayed can include information that is contained in the label ID table 230, as well as some of the information from the label text table 240. The result view displays texts in the selected language combined with extra information available through the relation to the table 230. The results of the search are presented to the developer in ascending order by GUID. An example of results are displayed in area 610 of FIG. 6. However, other ordering techniques can be used such as ascending order by text matching. The developer then checks to see if any of the label texts match the desired text. This is illustrated at block 520. If a text matching the desired text for the new label is found, the developer then highlights, or otherwise indicates, the specific label that matches the desired label text. This is illustrated at block 507. Translations of the label may also be shown at 620, if desired.

Next the system checks to see if the selected label category and namespace are the same as the category of the new label. This is illustrated at block 508. If the label category and namespace are the same between the selected label and the new label, the information of the selected label is used for the new label. This is illustrated at block 509 of FIG. 5.

If the namespace and category of the label is not the same as the desired use for the new label, the label must be duplicated. This duplicated information also includes all the translated versions of the selected label. When the label is duplicated to the new label, an entry is made in the label ID table 230 for the new label indicating the GUID of the label from which it was duplicated. This is illustrated at block 510. This makes it possible to update easily the text of the new label when the master label text is changed. This update on change can be made by executing a typical find and replace protocol or through any other automated method.

If the no matches were found during the search the developer must generate a new object for the new label. The generation of the new object is illustrated at block 521. During the generation of the label, the specific characteristics of the label are stored in the label ID table 230 and the label text table 240. If the text of the label is not complete the developer enters in the remainder of the desired text in the label dialog 600. The namespace and category codes are entered based upon the current settings of the label system. The developer must also generate translations for the label text in any desired languages. Also, the ID for the current operating language for the label are stored as the master language. The addition or generation of these translations and entry of label properties is illustrated at block 522.

In summary, instead of having a single resource file for each language, the information is instead split up into a 1::n relationship. The '1' side of the relation keeps the label identifier and other practical general label information. The 'n' side of the relation keeps the label text on the specific language. Arranging labels in this manner makes it possible to access labels on all languages at runtime.

During development of a new label, the label can be duplicated using an existing label in the system or by creating a new label from scratch. When searching for labels, it's possible to enter a expression (e.g. '<Ledger' gives all available labels starting with Ledger. However, depending on where the system is implemented different syntax can be used.). It's possible to reduce the hits by selecting a specific namespace or category to be search. The search could also be performed by using a term database. A new label can also be created by using the term database (web-service). When entering the term database, it's possible to combine a current search criteria with extra criteria's describing the actual situation in which the label is to be used. This to ensure that the right term is used. When a label is found in the term database it is duplicated to a new label The term database has or can have translations for all supported languages. When a label is to be used, it has to be present in the search result, matching the actual namespace and category. If this is the case it's possible to select the specific label. If this isn't the case, a new label is created by writing the label text by hand, or by duplicating the label from another namespace/category of term database. Duplicating a label gives a new identifier related to the current namespace and category. All texts and other general information are duplicated.

The management of labels is done by using a label dialog, which is called directly from the specific label property. The dialog makes it possible to maintain labels, and to select a specific label for use on the specific property. Using the label system through code happens through a Label interface giving the needed features. This makes it possible to change the way labels are stored. The storage could be a SQL metadata store, resource files or web services. In fact it could be a combination of all types of storage depending on the specific access to the web.

The Label dialog ensures that labels are used in the right situation. Introducing categories to the label system ensures that labels are used correctly. But the feature has also another purpose. When translating labels, it's possible to see where labels are to be used through a combination of the namespace information and category. This makes it possible to find the correct term to be used. Knowing where labels are used makes it possible to add more Best Practices checks to the Best Practices framework. The label dialog allows the generation of specific translation files fitting known (or unknown) translation tools. By exporting date information to the translation files, it's possible to check the dates when importing the translations. This is to secure that the ongoing translation process is up to date with the last changes in the system. With an updated cross reference system, it is possible to see where a specific label is used. It's also possible to see changes to a specific label. This feature is relevant for translators giving them the possibility to determine if changes to a specific label is simple (e.g. added a '.' At the end of the line).

When searching for labels it is difficult for the developer to identify existing labels that may be useful in the current application. The developer often does not know what labels are available in the database that hold the desired text that exist in other areas. Further, the developer desires to create labels that contain the correct information for the use, and the appropriate translations for the terms in the label.

The term database of the present invention extends the label system by providing extra features. These extra features can be controlled by translators or standards organizations. These features make it possible to add extra search criteria to the label dialog to help find labels that correspond to the actual desired use of the label. When these features are present, additional results will be returned to the developer to assist in choosing the correct term for the label. As developers tend to think in their own native language, these features will help standardize the terms used in labels when a single word in the developer's native language can be translated into multiple words in another language.

Figure 7A:
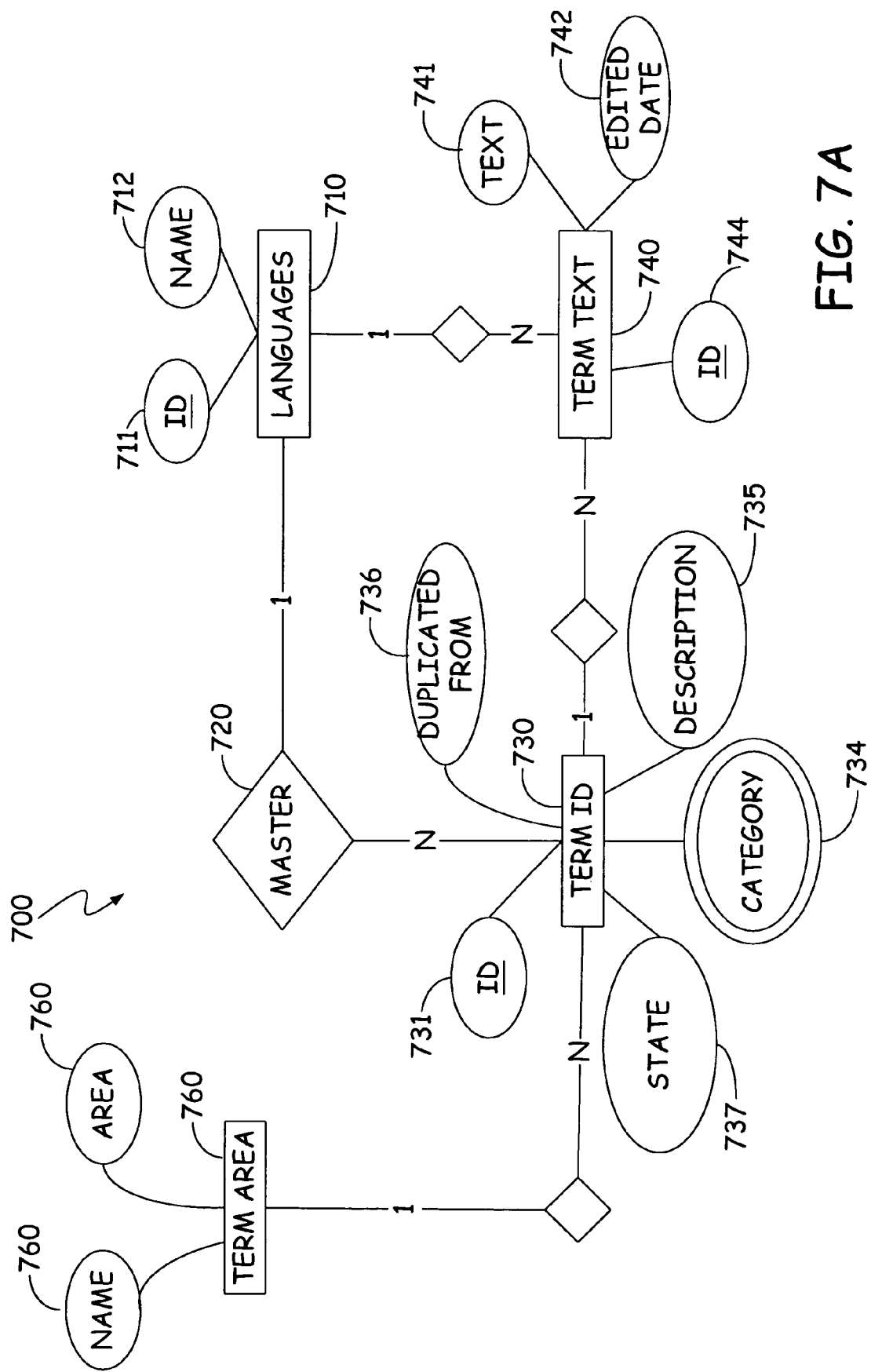
FIG. 7A is a block diagram illustrating the tables that comprise the term database of the present invention.

FIG. 7 is an entity relation diagram illustrating the relationship between various collections that comprise a term database for use in a label system, according to one embodiment of the invention. The label system can be in one embodiment the label system discussed in FIGS. 1-6 above, or can be used in any other system or application that makes use of terms and labels, such as a word processor, web browser, etc. The term database is similar to the label system but includes extra information. The entity relation diagram of FIG. 7 is similar to the entity relation diagram of FIG. 2. The term database system 700 includes a language table 710, a master relation 720, a term ID table 730, and a term text table 740. In one embodiment these collections are organized as structured query language (SQL) metadata stores arranged into tables. However, other arrangements and other databases for the collections can be used, such as an object oriented database.

The language table 710 is a table that includes at least two sub-fields. Further, language table 710 is similar to the language table 210 in the label system of FIG. 2. The two sub-fields in the language table 710 are a language ID field 711 and a language name field 712. The language ID field 711 holds a code that indicates a specific language, and is understandable by the business solution software program. The language name field 712 is a text field that holds the name of the language. For example, if one of the available languages is English-United States then the language ID field 711 illustratively could be "01", or it could be "en-us", if using ASCII standards. However, other ID types can be used in the language ID field 711, or any other method separate from a language table that represents the language as an ID.

The language table 710 is in a 1:n relationship with the term text table 740. This relationship (1:n) makes it possible to have a label text entry for each language available to the database 700.

The master 720 is in one embodiment a relationship including information related to the master language for the label 700. In another embodiment the master 720 stores the original version of the term in the original language and format. If master 720 is a table each term in the database 700 has an associated entry in the master table 720. Each master term is identified in the master table 720 by its unique identifier. The relationship between the master 720 and the language table 710 is a 1:1 relationship, and the term ID table 730 is also in a 1:1 relationship, because an entry in the master table 720 can exist only in one language for each label. In an alternative embodiment, the master 720 can be a field or fields that is part of either the term table 730 indicating the unique ID of the master term. Further, the Master language relation can, in one embodiment, become a field on the ID table 730 called Master Language Id.

The term text table 740 is similar to the label text table 240, and includes entries containing the text for each term identified by a term ID. The term text table 740 includes entries containing translations for each term ID in various languages. The relationship between the term ID table 730 and the term text table 740, as well as the relationship between the language table 710 and the term text table 730 is 1:n. This is because there is one entry in the term ID table 730 for each term, but the text of versions of a term can exist on several languages. However, in other embodiments of the present invention the relationship between the term ID and term text can be 1:1 (or 1:0 if no text is present), where each translation of the master term has its own unique term ID and entry in term ID table 730.

Term ID table 730, according to one embodiment of the present invention, includes an ID field 731, a category field 734, a description field 735, a duplicated from field 736 and a state field 737. An example of the Term ID table 730 is illustrated at FIG. 7B.

The ID 731 field is used to identify a specific term in the database 700. In one embodiment this ID is a global unique identifier or GUID. Each time a new term is generated it is assigned a new GUID. In one embodiment a new term is defined as a term that is new to the database 700, and not merely a translation of an existing term. However, in other embodiments, a new entry in the ID field 731 is generated for the translations of existing terms.

The category field 734 in the Term ID table 730 is a special field that illustrates in which component of a program the term is used. Further, the use of the category field 734 assists a developer when creating a label text to use the term in a correct manner. The category corresponds to a node type and a property for the term. Node types are the specific properties of the term. Thus, the category field 734 makes it possible to ensure that a term is used in a proper way for the desired program. The category makes it is possible to search the existing database of terms based on the type or category of term desired.

The description field 735 is an entry in table 730 that describes to the user or developer how the term is used in a specific situation. For example, the description field 735 can be an entry telling that the term is used in a ledger for a medical client. This description can be in words or it can be coded against a predetermined list of codes. Regardless of how the term is found the area of use will be available through the area field.

The duplicated from field 736 indicates whether the associated term of the entry has been copied duplicated from another term in the term database. If the term has been duplicated from another term, the duplicated from field 736 includes the ID 731 of the parent or master term 720. In one embodiment this ID is the GUID of the parent. However, other ID's can be used in field 736. If the term is not a duplicated version of another term then the duplicated from field 736 is blank or set to null. Further, if the text or any data of the term is changed from the master term's text after duplicating then the duplicated from field 736 is set to null, thereby eliminating any link between the master term 720 and this particular child term. However, other changes to the entry will result in the duplicated from field 736 being reset. In an alternative embodiment, the term ID table 730 includes fields that indicate what term ID's contain duplicated terms. A term in ID table 730 is either a master term or a child. When each translation of a term has it's own unique ID only the term in the original form is the master term. All other versions are child terms. Labels having the duplicated from field 736 assigned can be automatically updated based on the master represented by the specific ID.

The state field 737 is a field that indicates the state of the term in the term database. The state of the term is useful to a developer using the term database in determining the usefulness and the trustworthiness of a selected term in the database. The state field 737 can indicate if the term and its associated translations have been proofread against a standards association or other source. The state field 737 can also indicate who suggested the term to the term database. This can be useful if the developer only wants to use terms that were generated or suggested by a specific organization. However, other information that relates to the development of the term in the term database or relates to the reliability of the term can be stored in the state field 737 of the term ID table 730.

The term area 760 is an area that defines the use or areas of a specific term in the term database. The term area includes two fields, a name field 761 and an area field 762. The name key 761 assists developers and translators to see in which areas the term is used. The information contained in the name key 761 is provided by the developer when a new term is created, and provides information related to the use of the specific term. For example, the name key 761 may tell the developer that the term is used for in a ledger or in production. The area field 762 provides the developer with information related to the area that the term is used in documents or applications. For example the area field may tell the developer that the specific term is used in a production environment, or in a medical program. In other area the description field provides other information related to the use of the term.

The term text table 740 includes at least three different fields: a term ID field 744, a term text field 741 and an edited date 742. An example of the term text table 740 is illustrated in FIG. 7C. In alternative embodiments of the present invention additional fields can be added to the term text table 740 such as for language specific icons, bitmaps, sounds, movies, etc. These alternative fields can include a field 743 indicating the language the text is written in, or a field identifying the entry identifier of each version of the text in the term text table.

The term ID field 744 is a field that identifies the term ID 731 for the particular term text. This entry allows the developer and the system to know to which term ID 731 the present text is related. As the term text is translated from the master language (or any other language) to another language, a new term text entry is made in the term text table. These entries contain translated versions of the original term text in their respective languages. The edited date field 742 is provided in the term text table 740 so that developers know when the text of the term was last changed in the language associated with that particular entry in the term table. This date helps to ensure that if a translation for a text is provided, it does not replace an already more current version of the translation. When translations are automatically loaded into the system, through a job or otherwise, the translation dates are compared and if the version in the entry is more current than the proposed entry, the proposed entry is not entered into the table. Also the edited date field 742 allows the developer to check if the translations are current with the most recent version of the master text entry.

Figure 8:
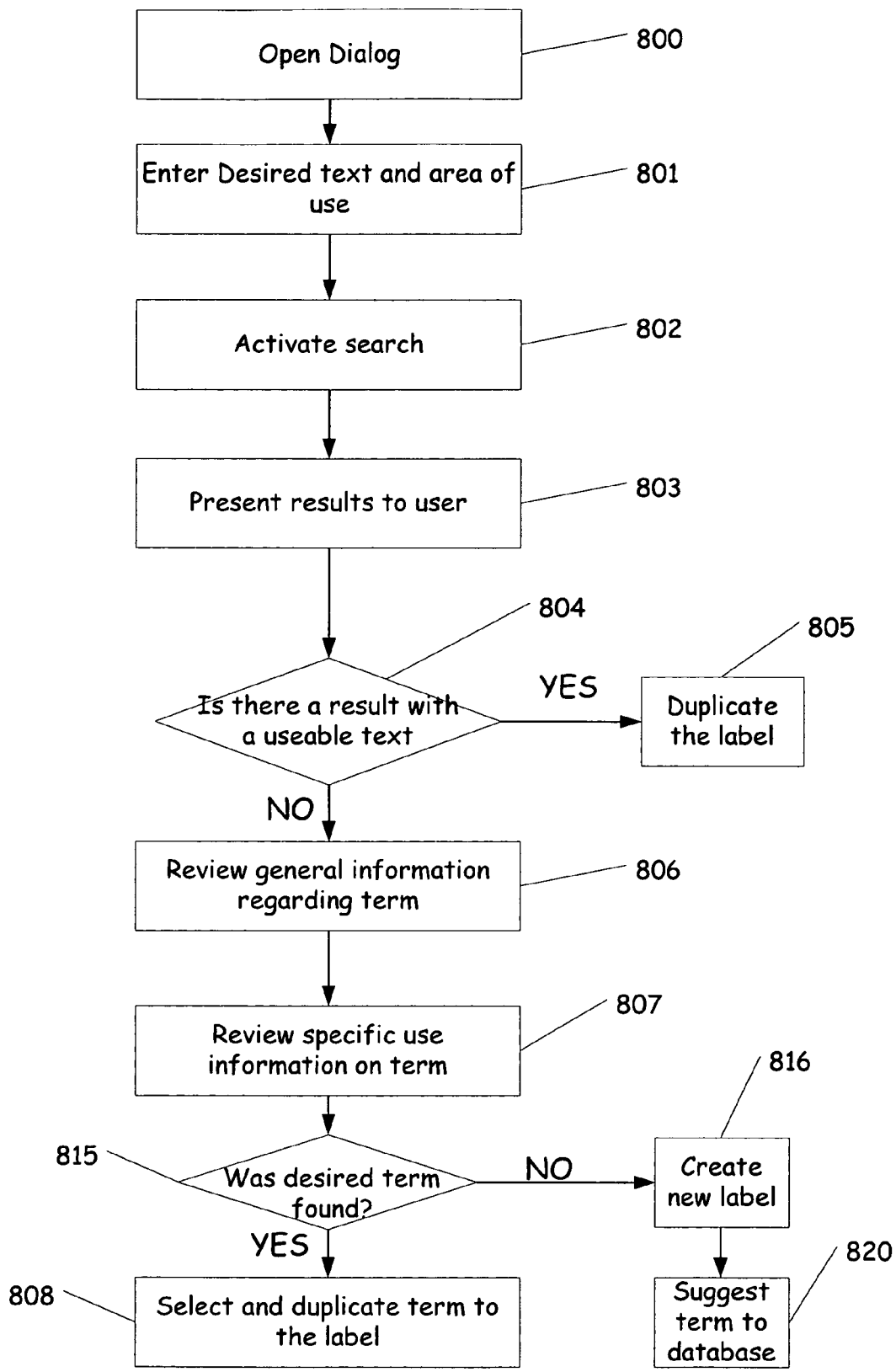
FIG. 8 is a flow diagram illustrating the steps executed when a searching for or creating a new term for a label.

FIG. 8 is a flow chart illustrating the steps executed by a developer when accessing the term database to find a desired term for a label according to one embodiment of the present invention. In one embodiment of the present invention the developer has full access to the term database, and can access, suggest, add or delete terms from the database. In other embodiments access to the term database is provided to term writers who are able to create terms. In this embodiment Labels suggested as terms by a developer are reviewed and added as new terms in the correct area by the term writers.

Figure 9:
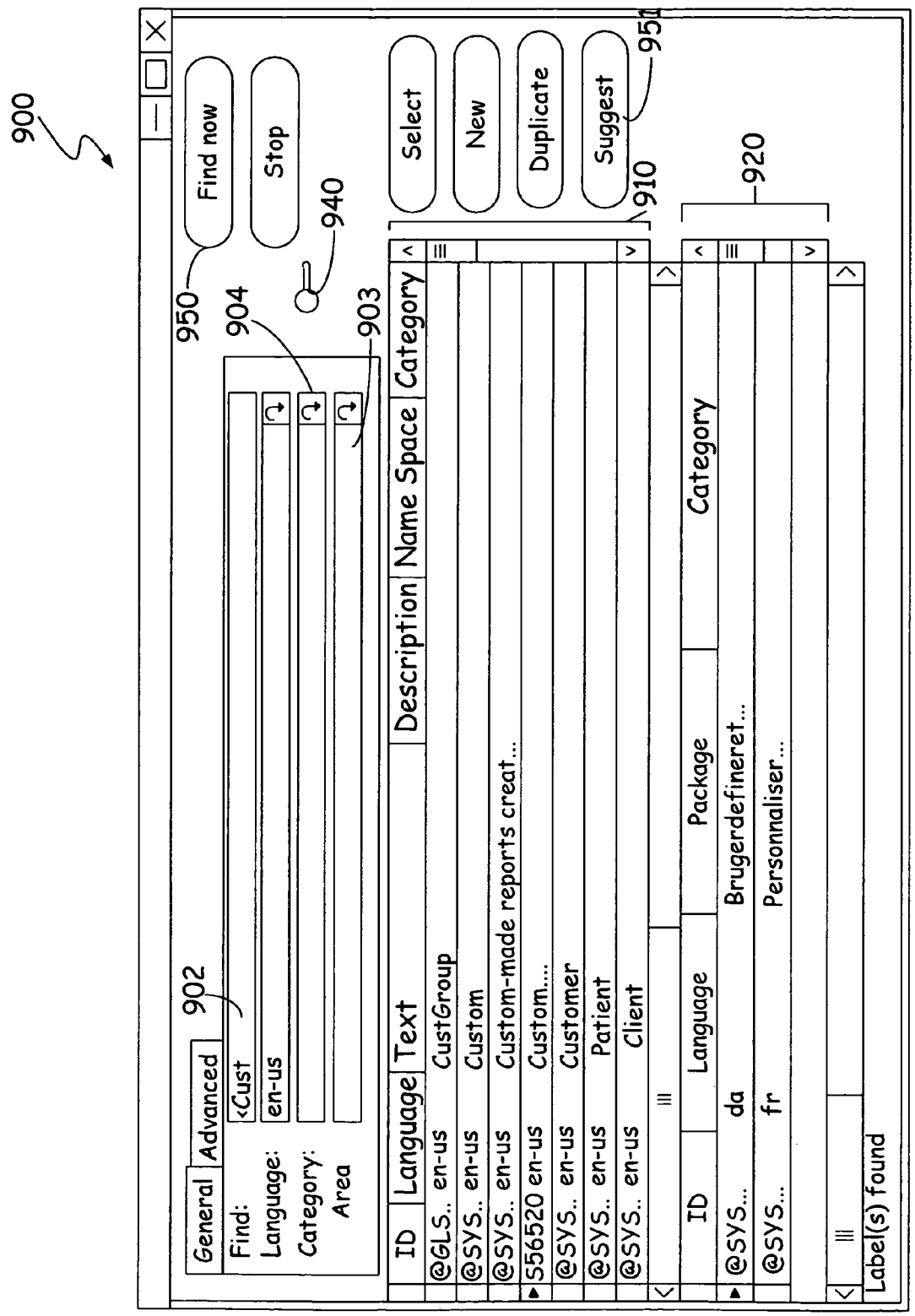
FIG. 9 is an example of a user interface invoked by the user when developing and searching the term database.

The searching for a term in the term database is similar to the search executed by the label system 200 in FIG. 5 above. However, the additional search parameters of the present invention allow for topic specific results to appear despite the text not matching the desired text. The developer usually accesses the term database through a dialog similar to (or the same as) the label dialog illustrated at FIG. 6 above. FIG. 9 illustrates an example of a dialog window that can be used in the present invention. However, other interfaces can be used to access the term database 700. The developer opens the dialog 900 at block 800.

The developer begins accessing the term database by entering in to the dialog 900 the desired terminology, or part thereof, for the label, as well as the category and area for the label. This is illustrated at block 801 of FIG. 8. The selection of the category and area in the dialog 900, can be done manually for example through the use of pull down menus or check boxes, or can be done automatically using the current controls of the system to set the category and area fields. The developer can also at this point select a specific use for the term, such as in a medical situation or a production situation. Next the developer accesses a search function on the dialog window by selecting a button such as button 950. The activation of the search function is illustrated at block 802 of FIG. 8. The search function proceeds through the term database and identifies entries in the term database that match the desired text of the label.

The search function gathers the identified entries in the term database as results. The results of the search are presented to the developer in section 940 of dialog 900. The results are then ordered or sorted according to a predetermined method. The arrangement of the terms in one embodiment is by text matching. However, other sorting methods can be used, such as sorting by specific area of use. The presentation of the results to the user is illustrated at block 803. In alternative embodiments, the developer can limit the search results to terms having a predetermined state, i.e. terms that were suggested or generated by a specific source.

The developer then reviews the results to determine if the desired term is found in the results. This is illustrated at block 804 of FIG. 8. If the results include a term that matches the exact term and category of the desired label, the developer can use the term on the label without having to make any adjustments to the terms of the label. The label is then duplicated at block 805. If the correct term is in the results but not in the correct category the developer then must determine which term is the most correct match to the desired term. The developer then can view the information contained in the description field of the terms entry in the. This field informs the developer of the general use of the term. This review of the information is illustrated at block 806.

Further, when the developer is reviewing the results the developer can view the information contained in the term area table 760 related to the specific use of the term. When the developer is reviewing terms to be duplicated, the same term can appear in the results multiple times. This often occurs when the desired term has multiple meanings in the searching language. For example a word in English may have multiple equivalent words in Spanish. The developer then must chose which term to use based on the information provided in the database. The area field 762 of the term area table 760 provides the developer with information regarding the specific use of the term in the selected category. For example, in English the word "customer" can have different meanings depending on the usage of the term. In a store setting a "customer" is a person who buys items from the store. However, in a medical situation, a "customer" is a patient. Therefore, through the use of the term area the developer can select the correct "customer" to use and thus obtain translations to the term that more closely match the desired terminology, based on the intended use of the term. The review of specific information of the term is illustrated at block 807.

If based on the use of the term, the term matches the developers intentions, the developer can select one of the terms and create a new label by duplicating the term to the new label. When a term is duplicated a new record is generated in the term ID table 730. Further all of the translations in the term text table are duplicated to the new record. Also, the unique ID for the original term is stored in the duplicated from field. This assists the developer or others in knowing that this term originated in another area. Also this allows the term and associated translations to be updated when the master term is updated such as when a job is invoked by a developer. The duplication of the term is illustrated at block 808 of FIG. 8.

If the desired term or use for the term was not located in the search of the term database 700. The developer then creates a new label with the desired text originally extend at block 816. The developer can also suggest the new term to the database. Generally, the developer will suggest terms to the database that are generic in nature. The developer suggests the word to the term database 700, by completing all of the requirements for the term, such as providing the category information, the description information, and the associated information related to the term area. This is illustrated at block 820 of FIG. 8.

When the developer selects the suggest button 951 on the dialog 900. This transmits the new term to the term database. Upon receipt of the term at the term database a new entry is created in the term database for the suggested term. At this time the state field 737 is set to suggested. Later after the term has been reviewed the term's state can be changed to reviewed or other indication that the term has been accepted by the term database. Also at this time the developer provides any existing translations for the term to the term database alternatively translations can be added to the term database by the translation later. All of the texts are stored in the term text table entry for the new term. The suggestion of a term to the term database is illustrated at block 820 of FIG. 8. During the suggestion process the developer can provide updated translation for existing terms if the currently provided translations are not accurate for the specific use of the term thereby updating the database.

Although the present invention has been described with reference to particular embodiments, workers skilled in the art will recognize that changes may be made in form and detail without departing from the spirit and scope of the invention.

What is claimed is:

1. A computer-implemented method of maintaining a term text database, comprising:

receiving data at an interface, the data being indicative of a proposed text for a new label, the new label being a proposed addition to a collection of labels that each have a corresponding term stored in the term text database, and wherein the collection of labels are user interface elements configured to identify a control within a user interface that is a displayable part of a computer software application;

utilizing a computer processor to search the term text database and identify therein a term associated with a text that has a desired correspondence to the proposed text and that also has a related use characteristic that has a desired correspondence to a user characteristic associated with the proposed text;

providing output that is indicative of the term, the output including the text and at least one related characteristic;

receiving an input indicating a preference for the proposed text over the term;

suggesting that a new term be added to the term text database, the new term being indicative of the proposed text; and adding the new term to the term text database, the new term being indicative of the proposed text.

2. The method of claim 1 further including a step of receiving a selection indicative of the proposed text.

3. The method of claim 1 wherein receiving data comprises receiving a category code associated with the proposed text.

4. The method of claim 1 wherein receiving data comprises receiving an indication of how the proposed text is used.

5. The method of claim 1 further comprising obtaining and storing translations of the proposed text.

6. The method of claim 1, wherein receiving data comprises receiving data that is input into a dialog user interface.

7. The method of claim 1 wherein searching the term text database comprises searching for term records in the term text database that are associated with a text that is similar to at least a portion of the proposed text.

8. The method of claim 1 wherein providing output comprises providing an output that is indicative of multiple term records in the term text database, each term record being associated with text that is similar to at least a portion of the proposed text.

9. The method of claim 1 wherein providing output comprises displaying a list of multiple term records in the term text database, each term record being associated with a text that is similar to at least a portion of the proposed text.

10. The method of claim 9 further including a step of displaying textual context information related to at least one of the displayed multiple term records.

11. The method of claim 1 further comprising creating a new object in the term text database for the new term.

12. The method of claim 11 wherein creating the new object comprises a step of assigning an identifier to the new term, wherein the identifier enables the new term to be distinguished from at least some other terms in the term text database.

* * * * *